Z. S. KELSEY.
Fruit-Gatherer.
No. 57,731.  Patented Sept. 4. 1866.
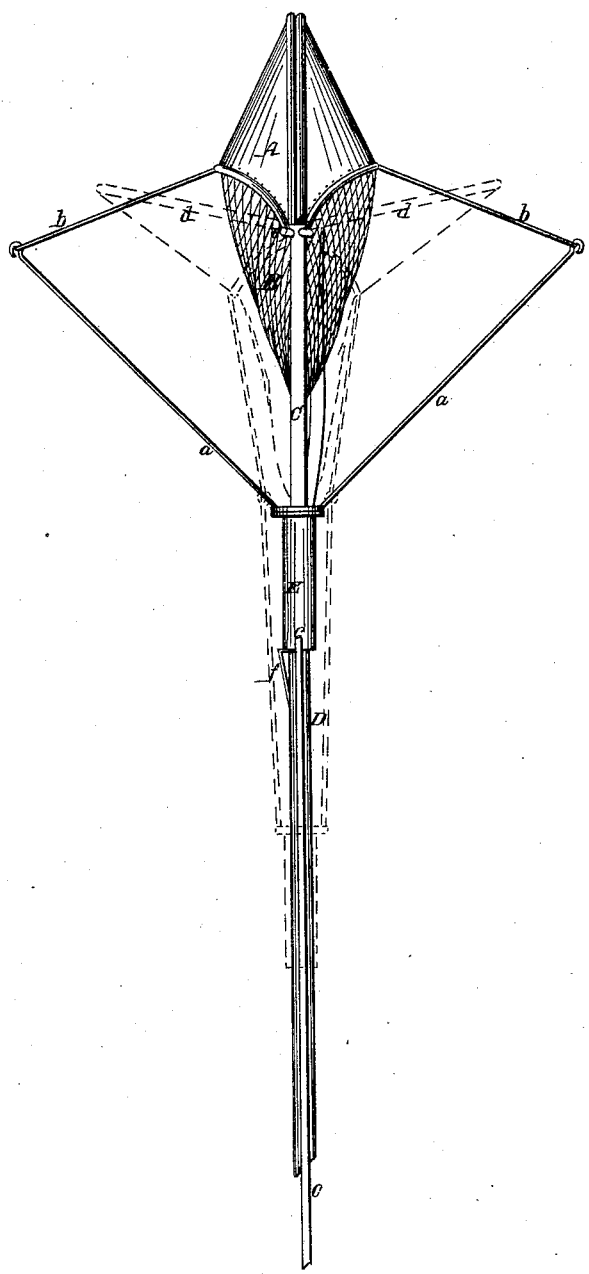
Witnesses:
W. H. Burridge
E. E. Ward
Inventor
Zebulon S Kelsey

UNITED STATES PATENT OFFICE.

ZEBULON S. KELSEY, OF HUNTINGTON, OHIO.

IMPROVEMENT IN FRUIT-GATHERERS.

Specification forming part of Letters Patent No. 57,731, dated September 4, 1866.

*To all whom it may concern:*

Be it known that I, Z. S. KELSEY, of Huntington, in the county of Lorain and State of Ohio, have invented certain new and useful Improvements in Fruit-Gatherers; and I do hereby declare that the following is a full and complete description thereof, reference being had to the accompanying drawing, making a part of this specification, in which the drawing represents a view of the gatherer.

Like letters of reference refer to like parts.

A represents the jaws of the fruit-gatherer, to which is secured the net B. These jaws are pivoted at $e$ to the bail C, which is fastened to the handle D.

E is a slide, to which is fastened the links $a\ a$. $b\ b$ are arms, which operate the jaws and are connected to the slide by the links $a\ a$. The slide operates the jaws by moving up and down on the handle. This is effected by a rod, $c$, attached to the slide and parallel to the handle, which may be as long as desired. The slide is pulled downward by the rod, and the links, acting on the arms, open the jaws, as represented by the dotted lines $d\ d$.

The gatherer can be elevated to the desired height and the jaws opened in the manner above described, and made to encircle the fruit. They are then closed by pushing the slide up, when the fruit drops into the net. This is also of great utility in gathering bees when they have settled upon some point difficult of access.

The jaws can be kept closed securely by a small spring, $f$, which, when the jaws are closed, springs out under the slide and holds it firmly.

What I claim as my improvement, and desire to secure by Letters Patent, is—

The construction and arrangement of the fruit-gatherer, as herein set forth.

ZEBULON S. KELSEY.

Witnesses:
J. W. BURRIDGE,
W. H. BURRIDGE.